United States Patent
Chalaud

(10) Patent No.: US 9,464,595 B2
(45) Date of Patent: Oct. 11, 2016

(54) OPTIMISING THE AVAILABILITY OF A THRUST REVERSER

(71) Applicant: SNECMA, Paris (FR)

(72) Inventor: Sébastien Chalaud, Vincennes (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/651,746

(22) PCT Filed: Dec. 6, 2013

(86) PCT No.: PCT/FR2013/052987
§ 371 (c)(1),
(2) Date: Jun. 12, 2015

(87) PCT Pub. No.: WO2014/096619
PCT Pub. Date: Jun. 26, 2014

(65) Prior Publication Data
US 2015/0361920 A1 Dec. 17, 2015

(30) Foreign Application Priority Data
Dec. 17, 2012 (FR) ...................................... 12 62148

(51) Int. Cl.
*F02K 1/76* (2006.01)
*B64D 33/04* (2006.01)

(52) U.S. Cl.
CPC ................. *F02K 1/76* (2013.01); *B64D 33/04* (2013.01); *F05D 2260/80* (2013.01)

(58) Field of Classification Search
CPC ...................................................... F02K 1/763
See application file for complete search history.

(56) References Cited

U.S. PATENT DOCUMENTS

| 5,431,085 A * | 7/1995 | Geffray ................... F02K 1/766 91/44 |
| 2002/0157377 A1 | 10/2002 | Ahrendt |
| 2005/0075769 A1 | 4/2005 | Eschborn et al. |
| 2010/0242434 A1* | 9/2010 | Bader ........................ F02K 1/76 60/226.2 |
| 2014/0229122 A1* | 8/2014 | Horabin ............. G05B 23/0235 702/35 |

OTHER PUBLICATIONS

International Search Report as issue in International Patent Application No. PCT/FR2013/052987, dated Apr. 14, 2014.

* cited by examiner

*Primary Examiner* — John R Olszewski
*Assistant Examiner* — Jason Roberson
(74) *Attorney, Agent, or Firm* — Pillsbury Winthrop Shaw Pittman LLP

(57) ABSTRACT

A method of controlling a thrust reverser made up of a plurality of pieces of equipment, wherein, in the event of it being detected that one of the pieces of equipment has not activated by the end of a predetermined activation period, an error message relating to the malfunction of the thrust reverser is generated, and in spite of the error message being generated, activation of the equipment is continued, and if the equipment is finally activated before a predetermined maximum period for deployment of the thrust reverser, then deployment of the thrust reverser is continued and the error message relating to the malfunction of the thrust reverser is withdrawn.

5 Claims, 4 Drawing Sheets

OPTIMISING THE AVAILABILITY OF A THRUST REVERSER

CROSS REFERENCE TO RELATED APPLICATIONS

This application is the U.S. National Stage of PCT/FR2013/052987 filed Dec. 6, 2013, which in turn claims priority to French Application No. 1262148, filed Dec. 17, 2012. The contents of both applications are incorporated herein by reference in their entirety.

BACKGROUND OF THE INVENTION

The present invention relates to the general field of aviation turbine engines, and in particular to the thrust reversers of airplane turboprops or turbojets. It relates more particularly to a method of controlling a thrust reverser.

Numerous airplanes fitted with such engines are grounded because of faults due to an error message issued in the cockpit of the airplane, and in particular a "RevFault" error message that informs the pilot of a problem on a thrust reverser, with the consequence of significantly limiting the availability of airplanes.

Such an error message corresponds in reality to more than a dozen individual fault messages relating to the thrust reverser, and it suffices that any one of these individual fault messages is present for the sole error message to be activated. However, most of the individual fault messages can be followed by a piece of equipment ending up correctly deployed/stowed/moved. Nevertheless, no distinction is drawn between a piece of equipment that is slow and a piece of equipment that is indeed blocked, such that if at the end of a length of time T the piece of equipment under consideration has still not reached the expected position, then the individual fault message that has been generated will activate the error message in the cockpit and will remain engaged until the airplane engine is switched off, thereby preventing the thrust reverser being deployed if the message appears before the deployment command or merely preventing reverse thrust being applied even if the thrust reverser nevertheless ends up by deploying and could thus have been used to continue or undertake its mission.

OBJECT AND SUMMARY OF THE INVENTION

An object of the present invention is to mitigate those drawbacks by proposing a novel method of controlling turbine engine thrust reversers that enables a thrust reverser to be deployed and used even after a first error message has appeared relating to a malfunction of the thrust reverser.

The invention thus provides a method of controlling a thrust reverser made up of a plurality of pieces of equipment, wherein, in the event of it being detected that one of said pieces of equipment has not activated by the end of a predetermined activation period, an error message relating to the malfunction of said thrust reverser is generated, the method being characterized in that in spite of said error message being generated, activation of said equipment is continued, and if said equipment is finally activated before a predetermined maximum period for deployment of said thrust reverser, then deployment of said thrust reverser is continued and the error message relating to the malfunction of said thrust reverser is withdrawn.

Thus, in spite of the slowness of one of its pieces of equipment, the thrust reverser can nevertheless be fully deployed and reverse thrust can be used, which is not true in the prior art where a single piece of the equipment responding slowly leads to an irreversible error being issued that prevents any use of the thrust reverser.

Preferably, when said predetermined maximum period for deployment of said thrust reverser is exceeded, said error message relating to the malfunction of said thrust reverser is issued once more and any use of reverse thrust is inhibited.

Advantageously, in parallel with generating said error message relating to the malfunction of said thrust reverser, an individual fault message relating to said piece of equipment that led to the error message being issued is stored.

Said predetermined activation time of a piece of equipment is adapted to each piece of equipment as a function of its own dynamic behavior and said piece of equipment is any one of the following pieces of equipment of a thrust reverser: the primary lock, the tertiary lock, the door actuator, the directional valve DSV, the tertiary lock valve TLSV, the isolation valve ISV, the directional control valve DCV unit, or indeed the isolation control unit ICU.

BRIEF DESCRIPTION OF THE DRAWINGS

Other characteristics and advantages of the present invention appear from the following description made with reference to the figures, which show an implementation having no limiting character, and in which.

DETAILED DESCRIPTION OF THE INVENTION

Figure 1:
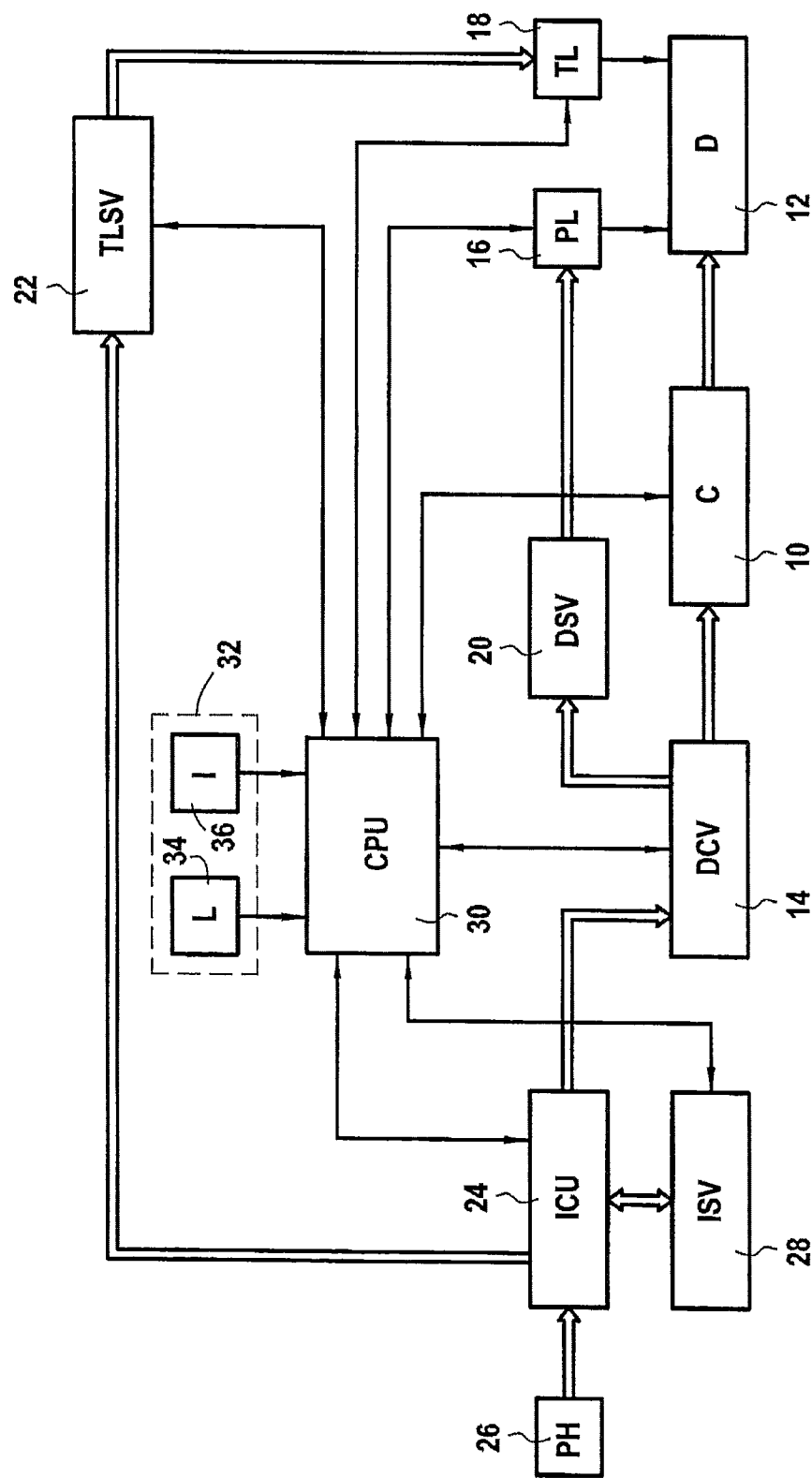
FIG. 1 is a block diagram of the various pieces of equipment of a turbine engine thrust reverser enabling the control method of the invention to be performed.

FIG. 1 is a block diagram of the various pieces of equipment for performing the function of reversing the thrust of a turbine engine.

This function is organized around an actuator 10 for actuating the door 12 of the reverser with its travel direction being managed by a directional control valve (DCV) unit 14. The door is held in place by primary lock means (PL) 16 and tertiary lock means (TL) 18 that are fed via respective hydraulic valves, namely a directional valve (DSV) 20 and a tertiary lock valve (TLSV) 22, either via the DCV 14 or else directly from an isolation control unit (ICU) 24 connected to a hydraulic power supply 26. An isolation valve (ISV) 28 in connection with the control unit 24 serves to isolate the hydraulic circuits or to put them under pressure. A central control unit of the turbine engine, e.g. a full authority digital engine controller (FADEC) 30 serves to control the states of these pieces of equipment depending on the actions undertaken by the pilot in the cockpit 32 on control levers 34. In the cockpit, indicator lights or sounds 36 serve in particular to provide the pilot with error messages coming from these pieces of equipment.

Figure 2:
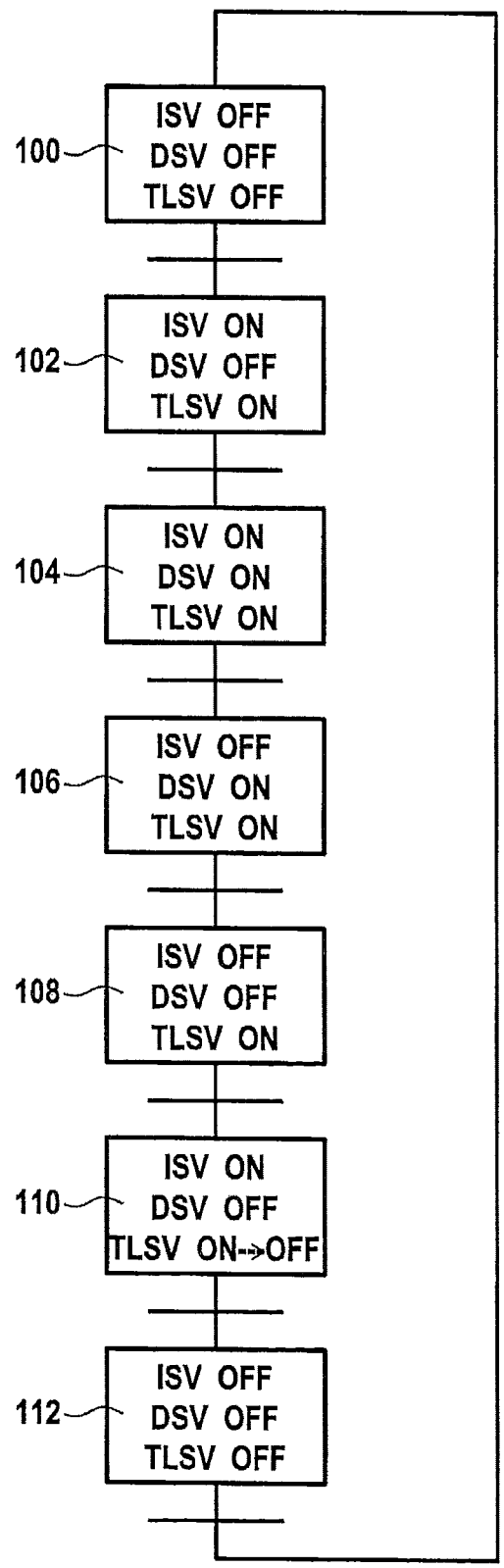
FIG. 2 is a sequential function chart illustrating the operation of the FIG. 1 thrust reverser.
Figure 3:
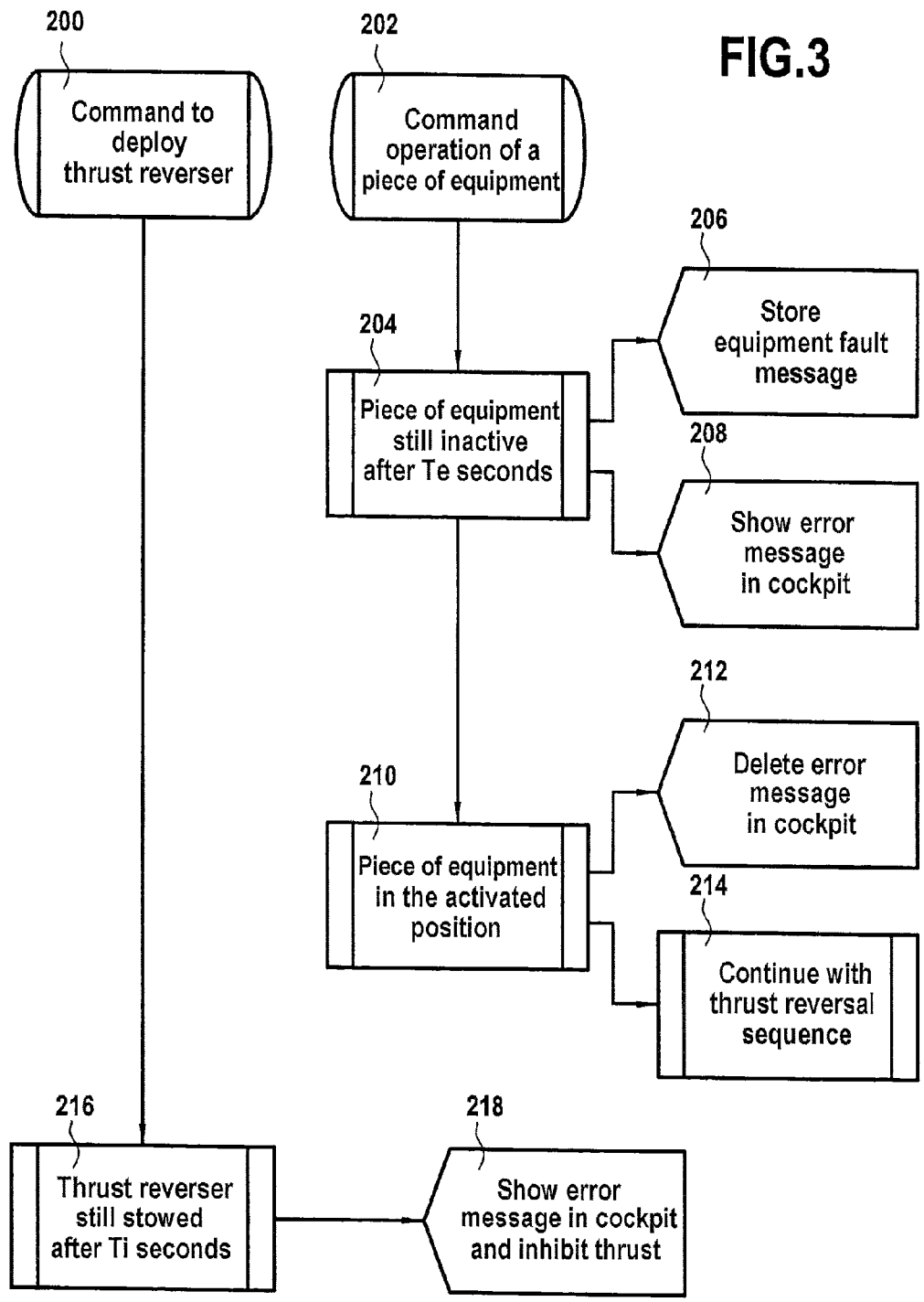
FIG. 3 shows the various steps of the thrust reverser control method of the invention.

FIG. 2 is in the form of a sequential function chart or "Grafcet" showing the operation of the thrust reverser with the various states through which the pieces of equipment shown in FIG. 1 pass when deploying or stowing such a thrust reverser.

The thrust reverser is controlled by a controller present in the central control unit 30 and having the following successive states:

the initial state (INIT 10) is the rest position in which the isolation valve (ISV) for isolating the hydraulic pressure and the directional valve (DSV) are not controlled (not controlling the DSV amounts to directing the hydraulic power, if any is present in the circuit, in the direction for closing the directional control unit DCV). The tertiary lock valve (TLSV) is not powered either;

deploying the reverser covers two successive states, an OVERSTOW state 12 and a DEPLOYING state 14. The circuit is initially pressurized by opening the isolation valve ISV and the airplane powers the valve TLSV at the same time, thereby opening the tertiary locks and causing the door actuator to move towards its overstow position. Thereafter the directional valve DSV changes direction, which begins by opening the primary locks and then deploys the door with the help of its actuator;

the DEPLOYED state of the inverter 16 in which the door is open and makes reverse thrust possible. The pressure in the circuit is then switched off by closing the isolation valve leading to the tertiary locks being closed; and the overstow state of the reverser covers three successive states, a WAIT state 18, a STOWING state 20, and an END STOWED state 22. The directional valve DSV is initially put in the overstow direction (WAIT) and then the circuit is pressurized by opening the isolation valve, thereby opening the tertiary locks and actuating the door actuator in the door stowing direction. The door slams against the primary locks and the tertiary locks reclose when the feed to the tertiary lock valve TLSV is interrupted by the airplane (STOWING). Pressure is then also interrupted (END STOWED) by closing the isolation valve and the thrust reverser returns to its initial state (INIT).

Between each of the states, various events are expected in a precise order. Thus, by way of example during the deploying sequence, these are:

applying pressure to the hydraulic circuit;
the airplane feeding the tertiary lock valve;
opening the tertiary locks, etc. . . . .

Each step is monitored and an individual fault message is triggered if the time taken to perform the step is too long. The individual fault message is stored, e.g. in the FADEC, and is used in particular by maintenance teams for repairing the faulty equipment.

Nevertheless, in the invention, the thrust reverser can nevertheless end up fully deployed and can be used, as was not possible before the present solution, where slowness in performing any one of the above steps meant that the thrust reverser could not be used. To achieve this, the method of the invention thus consists in detecting that a piece of equipment is slow in reaching its final position, but is not blocked, and under such circumstances, then continuing deployment of the thrust reverser in order to enable reverse thrust to be used.

Each deploying/stowing step of thrust reverser equipment is monitored while using fault detection logic specific to each piece of equipment and a maximum activation time appropriate to each piece of equipment as a function of its own dynamic behavior.

The principle of the method of the invention can be illustrated using any piece of equipment, and by way of example the tertiary locks (TL), and by means of the flow chart of FIG. 2.

During deployment of the thrust reverser, in a first step 200, it is necessary to operate various pieces of equipment in succession, i.e. in the illustrative example, to open the tertiary locks (step 202). The time required for each of these locks to open, i.e. the time for activating the equipment, is thus monitored, and once the equipment is positioned in the desired state, i.e. the lock is opening, if the conditions for the equipment being activated are satisfied, i.e. if it is detected that a tertiary lock valve TLSV has hydraulic pressure and is open, then a counter can be started that stops when the equipment is in its final activated position, i.e. once the lock is open.

If the equipment is still not activated, i.e. if the lock is still not open at the end of the maximum length of time allowed for that lock (step 204), then an individual fault message specific to the problem in question ("TL blocked shut") in the present example) is issued and stored in a step 206 so that maintenance can act on the lock, and in parallel (step 208), an error message "RevFault" is sent to the cockpit to inform the pilot that the thrust reverser has a problem because of the failure of the equipment in question and therefore runs the risk of not deploying. Nevertheless, the system continues to attempt to activate the equipment, i.e. to attempt to open the lock.

If the equipment ends up being activated in a following step 210, i.e. if the tertiary lock ends up by opening, then the "RevFault" error message previously sent to the pilot is caused to disappear (step 212), while the individual fault message nevertheless remains stored for subsequent maintenance action in order to look or the causes of this activation out of normal time. The pilot then knows that the reverser has ended up by opening and that reverse thrust is available. Since the lock does indeed end up by being open, that means the lock was slow but not blocked in the closed position. It is thus possible to continue the sequence in nominal manner (step 214), which is not possible in prior art systems since no distinction is drawn between a lock that is slow and a lock that is blocked in the closed position, i.e. between equipment that is activated in time or late, and that under such circumstances no reverse thrust is available and the thrust reverser cannot be deployed.

Since the sequence for deploying the thrust reverser is no longer blocked by the equipment being slow, a counter for maximum overall deployment time is started in a step 216 so as not to engage reverse thrust "too late" after the pilot's request, since that might be troublesome in certain flight configurations. Under such circumstances, and in spite of the various pieces of equipment being successfully activated, the "RevFault" error message appears in the cockpit to inform the pilot that reverse thrust is impossible in a final step 218.

Naturally, the operating principle of the invention illustrated above in general terms for the tertiary locks can be applied in the same manner (naturally with appropriate maximum activation times) to any other piece of equipment of the thrust reverser, such as the primary locks, the actuator of the door(s), the directional control valve DCV, the tertiary lock valve TLSV, or indeed the isolation control unit ICU, with this applying either when deploying or when stowing the various pieces of equipment.

Figure 4:
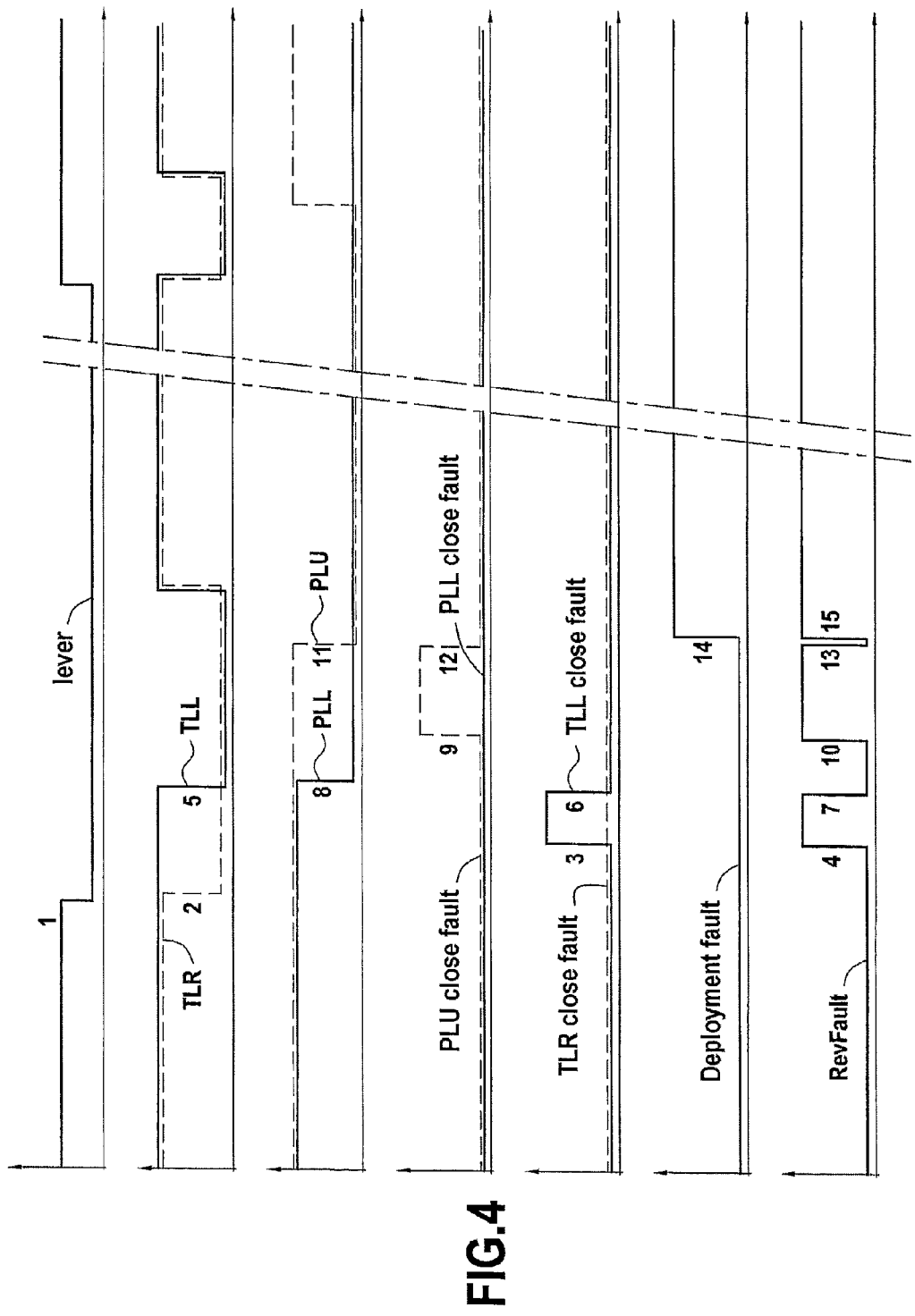
FIG. 4 is a timing chart of the successive operations initiated in the method of the invention when attempting to deploy a thrust reverser.

The sequence illustrated in the timing chart of FIG. 4 shows the method of the invention being applied by way of example when individual faults affect two pieces of equipment of the thrust reverser in succession, namely the left tertiary lock (TLL) and then the upper primary locks (PLU).

When the pilot in the cockpit requests thrust reverser (reference 1 in the timing chart), the right tertiary lock (TLR) opens normally (it goes to the low level—reference 2), but the left tertiary lock (TLL) remains blocked shut (it remains in the high level). At the end of a predefined length of time that is judged to be abnormal for such a piece of equipment, the individual fault message "TLL failed locked" is issued (move to high level—reference 3), and the "RevFault" error message is sent to the pilot (move to high level—reference 4).

Nevertheless, attempts continue to be made to achieve deployment, and the left lock also finally opens correctly (move to low level—reference 5), thus meaning that the left lock was merely slow and not actually blocked. The fault and the corresponding message about the left lock disappears (the "TLL failed locked" signal returns to the low level—reference 6) as does the message to the pilot (the "RevFault" signal returns to the low level—reference 7).

Deployment of the reverser then continues and the low primary locks (PLL) open normally (move to low level), but the upper primary locks (PLU) remain blocked in the closed position (stay at the high level—reference 8). At the end of a predefined length of time that is judged to be abnormal for such a piece of equipment, an individual fault message "PLU failed locked" is issued (reference 9), and once more the "RevFault" error message is sent to the pilot (reference 10).

Nevertheless, attempts continue to be made to deploy, and the upper locks finally open correctly (move to low level—reference 11) thus meaning that the upper lock was slow and not actually blocked. The individual fault message about the upper lock disappears (the "PLU failed locked" signal returns to the low level—reference 12) and the error message to the pilot also disappears (the "RevFault" signal returns to low level—reference 13).

Nevertheless, when the total time taken to open the doors exceeds a predefined maximum limit (set as a function of pilot reaction time and airplane speed), an individual "Deploy failed" fault message (reference 14) is then issued firstly to not authorize reverse thrust (since it would arrive too late) and secondly to inform the pilot that such reverse thrust is not available by issuing the "RevFault" error message once more (reference 15).

The invention claimed is:

1. A method of controlling a thrust reverser made up of a plurality of pieces of equipment, comprising, in the event of it being detected that one of said pieces of equipment has not activated by the end of a predetermined activation period, generating an error message relating to the malfunction of said thrust reverser, and in spite of said error message being generated, continuing activation of said one of said pieces of equipment, and if said one of said pieces of equipment is finally activated before a predetermined maximum period for deployment of said thrust reverser, continuing deployment of said thrust reverser and withdrawing the error message relating to the malfunction of said thrust reverser.

2. A method according to claim 1, wherein when said predetermined maximum period for deployment of said thrust reverser is exceeded, issuing once more said error message relating to the malfunction of said thrust reverser and inhibiting any use of reverse thrust.

3. A method according to claim 1, wherein said predetermined activation period for a piece of equipment is adapted to each piece of equipment as a function of its own dynamic behavior.

4. A method according to claim 1, wherein in parallel with generating said error message relating to the malfunction of said thrust reverser, the method comprises storing an individual fault message relating to said one of said pieces of equipment that led to the error message being issued.

5. A method according to claim 1, wherein said one of said pieces of equipment is any one of the following pieces of equipment of a thrust reverser: a primary lock, a tertiary lock, a door actuator, a directional valve DSV, a tertiary lock valve TLSV, an isolation valve ISV, a directional control valve DCV unit, or an isolation control unit ICU.

* * * * *